United States Patent [19]

Terry et al.

[11] 4,311,014

[45] Jan. 19, 1982

[54] POWER CYCLES BASED UPON CYCLICAL HYDRIDING AND DEHYDRIDING OF A MATERIAL

[76] Inventors: Lynn E. Terry, 22 Suncrest Ave., Bridgeton, N.J. 08302; Roger J. Schoeppel, P.O. Box 971, Stillwater, Okla. 74074

[21] Appl. No.: 126,378

[22] Filed: Mar. 3, 1980

Related U.S. Application Data

[62] Division of Ser. No. 900,769, Apr. 27, 1978, Pat. No. 4,198,827, which is a division of Ser. No. 666,786, Mar. 15, 1976, Pat. No. 4,090,361.

[51] Int. Cl.³ .......................................... F01K 25/10
[52] U.S. Cl. ........................................ 60/649; 60/671
[58] Field of Search ................. 60/649, 673, 651, 671

[56] References Cited

U.S. PATENT DOCUMENTS

3,943,719  3/1976  Terry et al. ..................... 60/649

Primary Examiner—Allen M. Ostrager
Attorney, Agent, or Firm—William R. Laney

[57] ABSTRACT

Apparatus for carrying out an exothermal chemical reaction of hydrogen which includes a hydrogen reactor which defines a first reaction zone for receiving hydrogen gas and a second reactant gas reactive with the hydrogen gas; a first hydride reactor containing a hydridable material in a second reaction zone positioned immediately adjacent the first reaction zone and in heat exchange relation thereto; conduit means for conveying the second reactant to the first reaction zone; a second hydride reactor containing a hydridable material for producing compressed hydrogen gas; and means for conveying the compressed hydrogen gas from the second hydride reactor to one of the first and second reaction zones.

3 Claims, 14 Drawing Figures

POWER CYCLES BASED UPON CYCLICAL HYDRIDING AND DEHYDRIDING OF A MATERIAL

This is a division of application Ser. No. 900,769, filed Apr. 27, 1978, now U.S. Pat. No. 4,198,827 which is a division of Ser. No. 666,786 filed Mar. 15, 1976, now U.S. Pat. No. 4,090,361.

BACKGROUND OF THE INVENTION

1. Field of the Invention

This invention relates to improved power and refrigeration thermodynamic systems which include as a cycle or subcycle within the systems, a hydride-dehydride-hydrogen cycle yielding, at one phase of the cycle, relatively high pressure hydrogen gas at an elevated temperature.

2. Brief Description of the Prior Art

In our copending U.S. patent application Ser. No. 553,248 filed on Feb. 26, 1975, we have described the continuous development of power and refrigeration in an efficient manner, utilizing a hydride-dehydride-hydrogen (HDH) efficient manner, utilizing a hydride-dehydride-hydrogen (HDH) cycle. For continuously supplying relatively high pressure hydrogen gas, a plurality of hydride-dehydride reactors are provided and are operated in out-of-phase or staggered sequence so that during the period when low pressure relatively cool hydrogen gas is being charged to one of the reactors, another is being activated and another being dehydrided to produce high pressure hydrogen gas. The pressure energy of the gas thus developed in the hydride reactors is used for continuously developing power and refrigeration, following which the hydrogen gas, at reduced energy, is recycled to the reactors to recommence the HDH cycle. In order to chemically compress the hydrogen gas in the form of its hydride, a low grade thermal source is utilized to supply heat to the several reactors.

In one aspect of the use of the HDH cycle as described in our copending application, the compressed and heated hydrogen gas which is released during the dehydriding phase of the HDH cycle is either passed directly to an expansion device, such as a turbine, or is utilized for transferring heat via a heat exchanger to a secondary or auxiliary system in which a heat input is desired. It is also contemplated, in the use of the HDH cycle as described in our copending application that the cold exhaust from the power generating expansion device can be used in a heat exchanger to provide refrigeration prior to recharging the depressurized hydrogen to the HDH reactor bank.

The described methods of utilization of the high pressure heated hydrogen gas which is developed as a gaseous product discharged from the reactor bank in the course of carrying out the continuously operated HDH cycle represent but a few of the uses which can be made of the hydrogen gas in its forms and energy states during the transition occurring between the time of discharge from the reactor bank in a pressurized state, until recharging to the reactors to recommence the hydriding process.

The Carnot cycle defines the limit of thermal efficiency which can be realized in the use of any heat engine operating in a cyclic manner. In actual practice, one approach to Carnot cycle ideality has been through the use of a power cycle referred to as the Rankine cycle. In the Rankine cycle, reversible adiabatic compression is followed by constant pressure heat transfer for heating, reversible adiabatic expansion and constant pressure heat transfer for cooling. Since it is easier to pump a liquid than a mixture of liquid and vapor, the Rankine cycle condenses the vapor and uses a pump to reversibly and adiabatically compress the liquid. Moreover, constant pressure input to the boiler is employed.

Other practical variations can be used to even more nearly approach the ideal Carnot efficiency in utilizing the Rankine cycle. Thus, by lowering the exhaust pressure from a turbine expander used in the cycle, more work is taken out of the compressed fluid passed through the turbine, and there is less rejected heat. This results, however, in a large moisture content in the exhaust from the expander. Also, superheating of the fluid charged to the expander allows an increase in efficiency plus the added benefit of raising the quality of the steam in the exhaust. All of the described improvements are in the nature of increasing the inlet pressure and/or temperature to the turbine expander and/or lowering the exhaust pressure and/or temperature. Rejected heat, while utilized to whatever advantage it can be used so as to approach Carnot efficiency, is nevertheless a secondary consideration, since present day Rankine cycle plants have been most economically designed to produce the most power. It continues to be of importance to consider ancillary equipment that can make better and more efficient usage of the rejected heat.

The maximum thermal efficiency of all power plants, whether using the Rankine cycle, the Brayton cycle or other power cycle, have been practically evaluated for many years. Little attention has been directed to the other end of the thermal energy spectrum—i.e., the lower limits for heat rejection. In most textbook considerations of this aspect of power cycles, the subject is dealt with as if such lower limit were near ambient conditions applicable to the power cycle, and in general this is about 289° K. Thus, most energy availability evaluations are based on approximately this temperature. Among the more promising utilizations of rejected thermal energy which have been proposed to this date are the use of this energy to heat buildings or to heat ponds utilized for raising algae or catfish.

If the commonly held notion that the lower limit for energy rejection is dictated by men's natural environment, and that waste heat must be rejected to the environment, were understood as not truly limiting, a substantial improvement could be obtained in the thermal efficiency of power plants by substantially lowering the temperature at which heat is rejected to well below ambient temperature. Though heat will, of course, be ultimately rejected to the environment, nothing prevents the use of several coupled thermodynamic cycles operating at different sink temperature. If this is accepted, it can be seen, for example, that by having an artificially provided sink of 100° K., a power cycle can be operated with such a sink and with a source temperature of, for example, 1000° K., thereby attaining a Carnot efficiency of 90 percent instead of the theoretical efficiency of 71 percent computed with the 298° K. temperature criterion.

If an amount of heat, $-dQ_h$, is withdrawn from a thermal reservoir and supplied during the heating phase of an ideal reversible power cycle, the entropy of the system using the power cycle is increased by $dQ_h/T_h$. The overall entropy change of the system during the power cycle must be zero since it is a closed cycle.

Therefore, the entropy of the system must also decrease by an amount, $dQ_h/T_h$ at another phase of the cycle. This can be accomplished at a lower temperature, $T_c$. The heat the system must reject to a thermal reservoir is equal to $dQ_h/T_h$, and since the heat rejected is at the lower temperature $T_c$, the heat rejected is $-dQ_c$ which is less than $dQ_h$ and the difference is the work produced. The entropy change of the thermal reservoir is increased by the amount $-dQ_c/T_c$. The total entropy of the universe is the sum of the entropy change of the system and the reservoirs which, if totally reversible, would be zero. Any irreversibilities must make the entropy of the universe increase and never decrease. The second law of thermodynamics imposes no limit as to what specific sink may be used, as long as the entropy of the universe increases or remains the same. Thus, there is no reason why one cycle cannot operate at a sink of 100° K., and an ancillary cycle utilized in combination therewith to provide such sink while such ancillary cycle is itself operating with a sink at 300° K., and thus ultimately provides the point of heat rejection to the universe, making the entropy increase.

In sum, though it has not heretofore been apparent, an absorption cycle can operate with an environmental heat sink (operated at approximately ambient temperature), and yet provide a cold (subambient temperature) sink as necessary to operate a primary cycle at an efficiency more nearly approaching the Carnot ideality.

Although most ancillary absorption cycles utilized in the manner described can only provide a sink temperature of as low as about 200° K., the HDH cycle which is described in our copending application can provide a sink approaching the triple point of hydrogen, 50° K. The absorption cycle thus provided can be very advantageously used, for example, with a direct cycle gas nuclear power plant using helium, argon or nitrogen, since the thermal efficiency of the primary cycle would be greatly improved by the lower heat sink, and the heat necessary to drive the absorption cycle by the operation of the hydride reactor would be readily available from lower temperature thermal energy (waste heat, etc.). Substantially all other types of existing power plants using conventional power cycles could also benefit greatly from the use of the auxiliary absorption cycle constituted by the HDH system, and near doubling of the power output using the same amount of fuel that is now used could be obtained in many instances.

BRIEF DESCRIPTION OF THE PRESENT INVENTION

The present invention comprises methods and apparatus for utilizing an HDH power cycle in which hydrogen gas is continuously produced at high pressure and elevated temperature in combination with various types of heating and cooling steps and devices, and with additional HDH power cycles or other power cycles to more efficiently use the thermal and pressure energy of the hydrogen yielded in the HDH power cycle.

In one aspect of the invention, the HDH cycle is used as an absorption cycle to provide a very low temperature heat sink for a primary power cycle which is thereby enabled to operate at a thermal efficiency which is substantially higher than is normally attainable with such cycle.

In another aspect, the HDH power cycle is improved by heating the compressed hydrogen gas leaving the hydride reactor bank upon dehydriding to impart a higher energy level prior to charging the hydrogen to an expansion device for producing work.

In another apsect of the invention, the compressed hydrogen discharged from the hydride reactor bank is split into two streams, with one undergoing heating before charging to the expansion device, and the other being cooled by yielding part of its heat through a heat exchanger to another system prior to passing through the expansion device. This improvement permits the construction and utilization of separate power production and refrigeration systems utilizing a single compressed hydrogen source derived from a single hydride reactor bank.

In another aspect of the invention, an HDH power cycle which utilizes, in different reactor banks, hydride materials which differ in their pressure and temperature levels of hydride equilibrium formation, are coupled in series so that the pressurized and heated hydrogen produced in the initial reactor containing the hydridable material which reaches equilibrium at a lower temperature and pressure is used to charge the reactor containing the hydridable material having a higher equilibrium temperature and pressure. After hydriding the material in the second reactor, the hydrogen released therefrom is at a much higher temperature and pressure than that developed in the first reactor and, upon expansion through a turbine or other work producing device, develops a substantially greater amount of work.

An important object of the present invention is to provide improved applications of the HDH power cycle, and particularly, more efficient utilization of the pressurized hydrogen gas derived from the hydride reactors employed in such cycle.

A further and more specific object of the invention is to provide a system in which the HDH power cycle is utilized to provide a low temperature heat sink for a primary working fluid power cycle.

Additional objects and advantages of the present invention will become apparent as the following detailed description of preferred embodiments of the invention are read in accordance with the accompanying drawings which illustrate such preferred embodiments.

BRIEF DESCRIPTION OF THE DRAWINGS

FIG. 3 is a temperature-entropy diagram of an HDH power cycle when the hydrogen is utilized solely for operating a turbine or the like.

DETAILED DESCRIPTION OF A PREFERRED EMBODIMENT OF THE INVENTION

Figure 1:
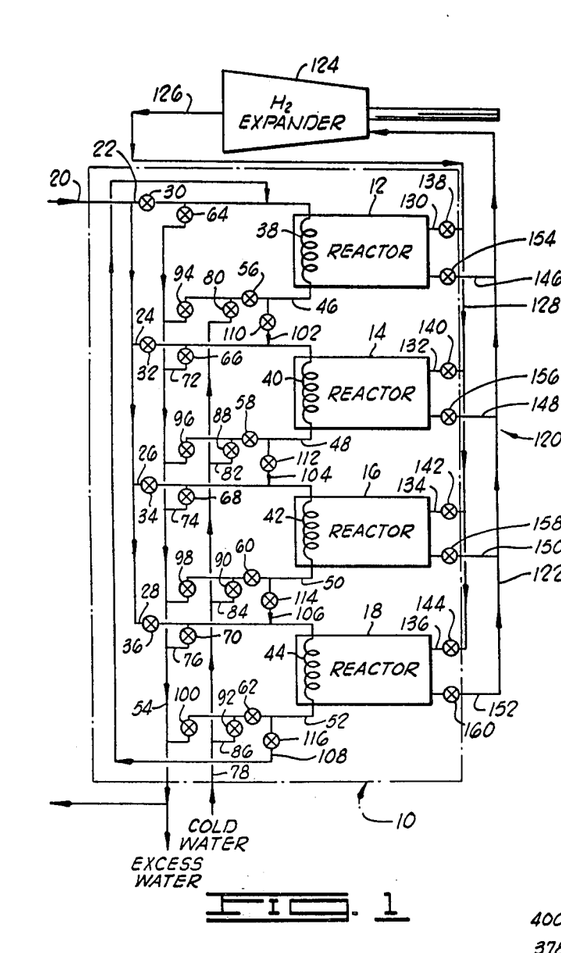
FIG. 1 is a schematic flow diagram of a hydride reactor system used in carrying out, in a continuous fashion, the HDH cycle of the present invention.

FIG. 1 of the drawings illustrates a hydride reactor system or bank 10 constructed in accordance with the present invention, and including a plurality of hydride reactors 12, 14, 16 and 18. A low grade thermal energy source, such as geothermal water, spent steam from a turbine used in a nuclear reactor, or any other suitable source of heat from a flowing fluid (solar energy can be the ultimate heat source), is charged to the reactor bank 10 through a conduit 20 and is admitted, in a controlled sequence, to the reactors 12-18 through branch conduits 22, 24, 26 and 28 via valves 30, 32, 34 and 36. The branch conduits 22-28 are respectively connected to heat exchange loops 38, 40, 42 and 44 located in the reactors 12-18, respectively. The heat exchange loops 38-44 are also connected through branch return conduits 46, 48, 50 and 52, respectively, to a return heat exchange fluid manifold conduit 54 through valves 56, 58, 60 and 62, respectively. The return heat exchange fluid manifold conduit 54 is connected to each of the branch conduits 22, 24, 26 and 28 through a plurality of respective valves 64, 66, 68 and 70. It will be noted that the latter three valves are located in short conduit sections 72, 74 and 76 which connect the return manifold conduit 54 to the branch conduits 24, 26 and 28.

A cold water charging manifold 78 is connected at one end through a valve 80 to the branch conduit 46, and is connected by a series of short conduit sections 82, 84 and 86 to the branch conduits 48, 50 and 52, respectively. These short conduit sections contain valves 88, 90 and 92, respectively. A valve 94 is positioned in the branch conduit 46 between the point of connection of the manifold conduit 54 to the branch conduit 46, and the point of connection of the latter conduit to the return manifold conduit 54. Similarly, valves 96, 98 and 100 are positioned in the branch conduits 48, 50 and 52 between the point of connection of the short conduit sections 82, 84 and 86 with these respective branch conduits 48, 50 and 52, and the points where the branch conduits are connected to the return heat exchange fluid manifold conduit 54. Residual heat exchange fluid conduits 102, 104, 106 and 108 are provided in the heat exchange medium circulation system, with the conduit 102 extending between the branch conduit 46 and containing valve 110. Conduit 104 extends between the branch conduit 48 and the branch conduit 26, and contains a valve 112. Conduit 106 extends between the branch conduit 50 and the branch circuit 76 and contains the valve 114. Finally, the conduit 108 interconnects the conduit 52 with the conduit 20 and contains a valve 116.

In general, the heat exchange medium circulation system functions to convey hot water or the like (a low thermal energy heat exchange medium) to the several heat exchange coils or loops 38-44 via the branch conduits 22, 24, 26 and 28 in alternating or sequential operation, and to convey spent heat exchange medium containing residual heat from one of the reactors 12-18 to a second of the reactors located downstream therefrom, after a portion of the heat from the heat exchange medium has been used for heating the upstream reactor to a predetermined temperature. The cold water manifold conduit 78 functions to convey water at relatively low temperature to the several heat exchange coils or loops 38-44 in alternating sequence with respect to the conveyance of the hot heat exchange medium from a suitable source to these same heat exchange loops. The return heat exchange manifold conduit 54 functions to collect the spent heat exchange medium at relatively low temperature after it has been circulated through the heat exchange loops or coils 38-44 in the reactors 12-18, and can be used to return at least a portion of this heat exchange medium to the system or systems from which it is derived for reuse. The manner in which the heat exchange medium circulation system, as thus identified and described, is employed in providing heat in alternating cyclical fashion to the reactors 12-18 is described in detail in our U.S. application Ser. No. 563,248, which teaching and disclosure is incorporated herein by reference.

A hydrogen gas power loop is utilized in conjunction with the reactor bank and is designated generally by reference numeral 120. The hydrogen gas power loop 120 includes a collection manifold conduit 122 for continuously receiving hydrogen gas under pressure in a selected and alternating cyclical fashion from the reactors 12-18. The manifold conduit 122 delivers the hydrogen gas at elevated temperature and pressure to a power producing hydrogen expander device, such as a turbine 124, through which the hydrogen is expanded to cause rotation of the turbine and to produce shaft power. The hydrogen gas, at reduced temperature and pressure, is discharged from the turbine 124 into a conduit 126 forming a portion of the hydrogen gas power loop, and is returned via hydrogen gas charging manifold 128 to a series of branch conduits 130, 132, 134 and 136 to the reactors 12-18, respectively. The branch conduits 130-136 contain, respectively, valves 138, 140, 142 and 144. For the purpose of conveying hydrogen gas at high temperature and pressure from the reactors 12–18 to the collection manifold 122, a plurality of branch conduits 146, 148, 150 and 152 are provided, and contain valves 154, 156, 158 and 160, respectively.

Each of the reactors 12–18 is a closed vessel which, in the illustrated embodiment of the invention, contains a solid material capable of reacting with hydrogen gas at relatively low temperature and pressure to form hydride compounds. Preferably the solid material used in the reactors for formation of the hydride is capable of reacting with hydrogen to form a stable hydride at a temperature below about 150° F. and a pressure which does not exceed 10 atmospheres. Where a plurality of different hdride materials are used in certain embodiments of the invention, as hereinafter described, the equilibrium temperature and pressure of the several hydrides formed by reaction with hydrogen may vary considerably as between the different hydride materials used in different reactors within the system. Materials suitable for use in the reactor include, but are not limited to, nickel-magnesium alloys, iron-titanium alloys, copper-magnesium alloys, vanadium metal, lanthanum-nickel compounds, lathanum-cobalt compounds, scandium metal, scandium-cobalt compounds and compounds of the generic formula $RT_5$, where R is a lanthanide ion, and T is a 3d-transition metal. A very suitable material, and one preferred for ordinary basic use of the HDH power cycle, is an iron-titanium alloy. Where this alloy is used, it can contain from about 20 weight percent to about 65 weight percent of iron, with the remainder being substantially entirely titanium.

The mechanism by which the solid hydride-forming materials combine chemically with hydrogen gas at relatively low temperatures and pressures, and can then be activated to produce pressured hydrogen gas, is set forth in detail in our copending application Ser. No. 553,248. Typically, the solid materials utilized in the reactors are materials which will combine chemically with hydrogen gas at relatively low temperatures and pressures to form a hydride. The hydrides which are formed by such chemical reaction may contain varying atomic ratios of hydrogen to the other elements in the hydride, depending upon the pressure and temperature at which the hydride reaction occurs. Various equilibrium states of the hydride exist in which differing amounts of hydrogen are chemically bound in the hydride molecule, with such amounts depending upon the equilibrium temperature and pressure utilized. In any case, the selected equilibrium pressure and temperature employed will depend upon the specific hydriding characteristics of the hydridable material used, and the particular heat sources available for supplying heat for the purpose of bringing the hydride up to the equilibrium temperature, and then activating the hydride prior to release of the pressurized hydrogen gas. Also, as will be apparent from the following discussion, selection of a particular hydridable material and equilibrium pressure and temperature will depend upon the application or utilization to be made of the HDH power cycle, and more particularly, the use to be made of the pressurized hydrogen gas developed thereby.

As explained in our copending application Ser. No. 553,248, it is generally desirable to utilize hydridable materials which, upon hydriding, develop the highest equilibrium pressure at the lowest equilibrium temperature and combine with the maximum amount of hydrogen gas at such equilibrium conditions. As further explained in our copending application, the reactor bank 10 utilized in developing the HDH power cycle is operated so that the reactors 12–18 are charged, and the material therein undergoes hydriding, in staggered or out-of-phase sequence. Each of the reactors contains a hydridable material, or differing hydridable materials having different equilibrium temperature and equilibrium pressure characteristics.

It is convenient to discuss the operation of the reactor bank 10 in terms of the initial phase of the HDH cycle being that at which the hydridable material is in a cold, deactivated state. "Cold" in this instance refers to, in general, a temperature lower than that required for hydriding and, generally, ambient temperature or lower. For the purpose of bringing a reactor to this state of lowered temperature, cold water or another suitable, relatively low temperature heat exchange medium is circulated through the heat exchange coil located in each of the reactors when the reactor is to be brought to this phase of the HDH cycle. The water is, of course, brought to the exchange coils in the reactor through the cold water manifold 78 and, as explained in our copending application, is introduced to the reactors in staggered or out-of-phase sequence. Concurrently with the cooling of the reactor in the manner described, hydrogen gas which has been exhausted through a turbine 124 or other work producing device is charged to the reactor which is at this phase in the cycle. At this time, the hydrogen gas is at relatively low pressure and temperature.

Figure 3:
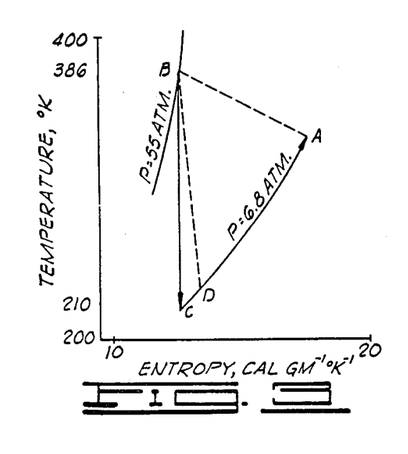

The hydrogen entering a reactor at this cold phase of the cycle combines chemically with the hydridable material in the reactor in an exothermic reaction which would commence to elevate the temperature in the reactor above the equilibrium temperature for the particular hydride which is formed were it not for the cooling by the coolant of manifold 78. Production of the hydride continues with controlled temperature until the equilibrium state is reached in which the hydride is saturated with respect to hydrogen at substantially that pressure at which the hydrogen is introduced to the reactor and at a temperature which is the equilibrium temperature which is characteristic of the particular hydride produced. This phase of producing the hydride by the exothermic reaction is illustrated by the state A in FIG. 3.

The valving used in the reactor bank 10 is then changed to cause the material in the reactor to undergo activation. This is accomplished by circulating a relatively warm or hot heat exchange medium to the heat exchange coil in the particular reactor which is at this stage of the cycle, with such heat exchange medium being ultimately supplied via the conduit 20, but being preferably directly derived as exhaust heat exchange medium from an upstream reactor which is undergoing dehydriding in the manner hereinafter described.

The passage of the relatively hot water through the coil of the reactor in which the hydrided material is being activated increases the temperature in the reactor from the equilibrium temperature to a temperature substantially above the equilibrium temperature. Concomitantly, the pressure is increased very substantially within the reactor. The volume is, of course, retained constant. This activation phase of the HDH cycle is represented by the line AB on the temperature-entropy diagram depicted in FIG. 3, and the attainment of the fully pressurized status upon completion of activation is represented by point B on this diagram. It is here that the advantage of the HDH procedure can be perhaps most appreciated. By the use of a relatively low temperature thermal energy source, the phenomena of chemical compression of the hydrogen gas occurs during activation as a result of the constant volume limitation imposed on the system which produces a source of very highly compressed hydrogen gas. The compressed hydrogen can then be used for a number of useful applications of the complete HDH power cycle, as will be hereinafter explained. Of course, in some instances, it is desirable to employ hydride-forming materials which have a higher equilibrium temperature and require a fluid having considerably higher thermal energy in order to attain a much higher post-activation phase temperature.

The next phase of the HDH cycle undergone by each one of reactors 12-18 in the course of cycling the reactor is the dehydriding phase. As explained in our copending application, at this time the appropriate one of the valves 154-160 are opened to release the pressurized hydrogen gas from that reactor which has been cycled through the activation phase so as to release pressurized hydrogen gas to the collection manifold conduit 122. At the same time that hydrogen is released from the reactor to the collection manifold conduit 122, a relatively hot heat exchange medium, passed to the reactor bank 10 from the conduit 20, is admitted, by suitable manipulation of the included valving, to the heat exchange coil of that one of the reactors which is in the dehydriding phase. The hydrogen gas from the collection manifold 122 can then be used in various ways, several of which are hereinafter described and constitute aspects of the present invention. For purposes of typical illustration, the compressed hydrogen is shown in FIG. 1 as being passed to a hydrogen expander device such as the turbine 124. Here the compressed hydrogen is expanded through the turbine to produce shaft power. Such expansion reduces the pressure of the hydrogen gas, and concurrently cools it to the temperature at which it is reintroduced to the reactor upon recommencement of the HDH cycle. Such expansion through the turbine is shown by the actual or practical expansion line BD on the temperature-entropy diagram in FIG. 3. This line may be compared with the isentropic expansion line BC on the same Figure, which latter line represents the ideal recovery of energy from the hot pressurized hydrogen gas upon expansion through a turbine.

Continuing to consider a single reactor undergoing phase changes in the course of the HDH power cycle, pressurized hydrogen continues to be released from the hydride bed at a substantially constant pressure, as the hot heat exchange medium is circulated through the heat exchange coil therein, until substantially all of the hydrogen has been chemically disassociated from the hydride, and all of the hydrogen previously chemically combined in the hydride is released as free hydrogen. After dehydriding has been completed, the temperature in the reactor is decreased, and complete depressurization is brought about by circulating a relatively cool heat exchange medium through the coil therein from the cold water manifold 78. The reactor is thus prepared for the introduction of cold hydrogen gas thereto from the charging manifold 128 and the recommencement of the HDH cycle.

As explained in our copending application, the described four phases of the HDH cycle as they are carried out in each of the reactors 12-18 within the reactor bank 10 are accomplished in an alternating or staggered sequence. In this way, pressurized hydrogen gas is being discharged from at least one of the reactors 12-18 into the collection manifold 122 at all times, and the supply of pressurized hydrogen is thereby rendered substantially continuous.

Figure 2:
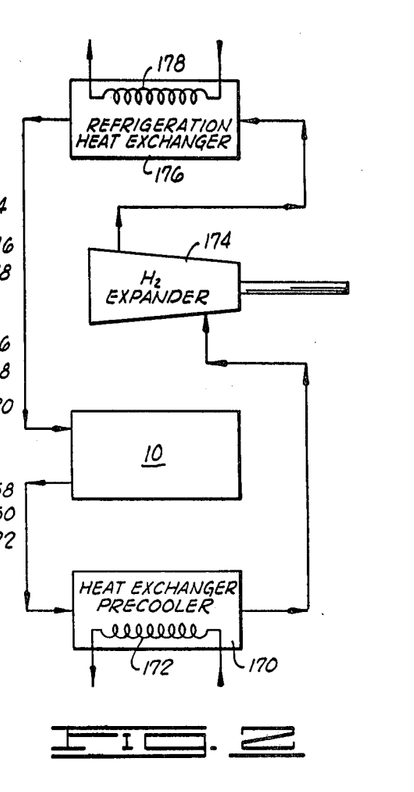
FIG. 2 is a schematic flow diagram illustrating the manner in which pressurized hydrogen from the hydride reactor system can be utilized for effecting heating, work production and refrigeration in the course of the HDH cycle.
Figure 4:
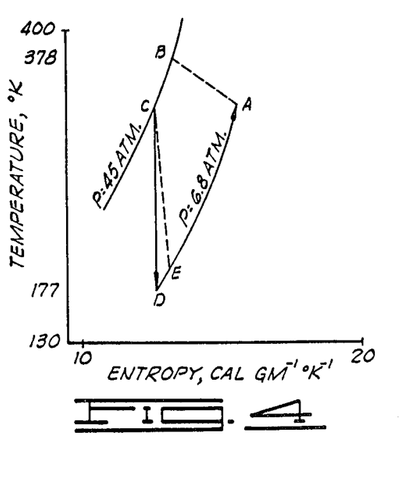
FIG. 4 is a temperature-entropy diagram of hydrogen as utilized in the power cycle schematically illustrated in FIG. 2.

One application of the HDH cycle carried out as thus described is illustrated in FIGS. 2 and 4 of the drawings. In FIG. 2, the reactor bank 10 is schematically illustrated. The flow diagram further portrays the compressed hydrogen gas developed in the reactor bank on a substantially continuous basis as being directed through a suitable conduit to a heat exchange precooler 170. In the heat exchange pre-cooler 170, the hydrogen gas from the reactor bank 10, at relatively high temperature and pressure, undergoes heat exchange with an external fluid flowing through a heat exchange loop or coil 172 to impart a portion of the heat of the hydrogen gas to the external fluid. After yielding a substantial portion of its heat to the external liquid passed through the heat exchange coil or loop 172, the hydrogen gas, still at high pressure, is expanded through the turbine 174 to substantially reduce the pressure and to concurrently reduce the temperature very significantly.

Cold hydrogen from the turbine 174 is then passed through the refrigeration heat exchanger 176 in which an external heat exchange medium is circulated through a coil 178. This may, for example, be a gas which is to liquefied by passage through the heat exchange coil 178, and particular reference is hereinafter made to the utilization of a heat exchanger of this type employing the cold hydrogen gas to provide a low temperature heat sink in a primary power cycle utilizing nitrogen gas. In the heat exchanger 176, the cold hydrogen gas absorbs heat from the heat exchange medium passed through the coil 178 to refrigerate this medium. In the course of undergoing heat exchange, the temperature of the hydrogen is elevated to some extent, and thus by the use of the heat exchanger 176, the hydrogen which is to be subsequently recharged to the hydride reactors is advanced toward the elevated equilibrium temperature which is attained in the HDH cycle.

The temperature-entropy relationship of hydrogen during the several phases of the HDH cycle carried out in the manner schematically illustrated in FIG. 2, is shown in FIG. 4 of the drawings. The line BC thereon depicts the drop in the temperature of the hydrogen gas, and the reduction in its entropy, occurring as the hydrogen gas is passed through the heat exchanger pre-cooler 170. The practical expansion line on the temperature-entropy diagram is illustrated by the dashed line C-E, and the refrigeration by the line E—A. It will be appreciated, of course, that the increase in temperature and entropy during the refrigeration is attained through the use of the refrigeration heat exchanger 176, which increases the temperature of the hydrogen gas over that which obtains in the gas discharged from the turbine 174. It will be perceived from the description of this mode of usage of the HDH power cycle that the cycle can be used to provide, concurrently, the development of shaft power by expansion through a turbine, and also heating and cooling.

Figure 5:
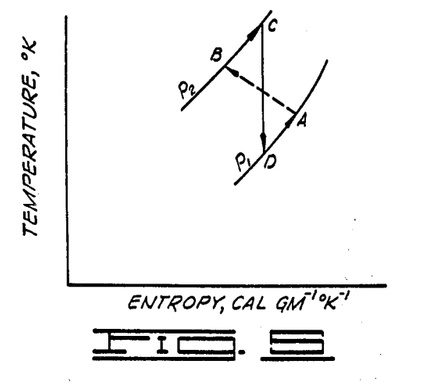
FIG. 5 is a temperature-entropy diagram for hydrogen, depicting the manner in which the compressed hydrogen produced by the hydride reactors can be heated to increase the enthalpy thereof prior to expansion through a turbine, and thereby increase the realized power production.

In some instances, an increase in power production is desirably obtained by further heating the compressed hydrogen gas produced in the reactor bank 10 prior to expanding it through a turbine or other expansion device. Where the process is carried out in this manner, the activation stage is represented by the line A-B on FIG. 5. Upon completion of activation, the hydrogen gas discharged during the dehydriding phase is initially passed through a heat exchanger in which the hydrogen gas is further heated at constant pressure, $P_2$, as contrasted with cooling of the hydrogen gas as effected in the heat exchanger pre-cooler 170 shown in FIG. 2. The entropy of the hydrogen is thereby increased from state B to state C as shown in FIG. 5. Subsequent expansion through the turbine to pressure $P_1$, resulting in increased production of power due to the greater initial thermal energy of the charged hydrogen, is shown by the line CD in FIG. 5.

The improvement obtained by the heating of the compressed hydrogen gas prior to expansion through the turbine has the further advantage of permitting a more efficient and greater energy utilization through the conservation of higher enthalpy fluids. This is accomplished by substituting a relatively low enthalpy fluid as the thermal energy source during the activation and dehydriding phases in the HDH cycle, thereby reserving the needed higher enthalpy heat exchange fluid for use in heating the compressed hydrogen from state B to state C prior to expansion through the turbine.

Figure 6:
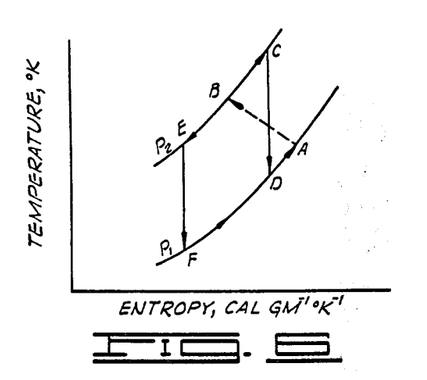
FIG. 6 is a temperature-entropy diagram illustrating the manner in which the compressed hydrogen from the hydride reactor can be divided into split streams for purposes of heating prior to expansion, and concurrently imparting heat to an external system.

Another useful application of the HDH cycle entails splitting or dividing of the compressed hydrogen leaving the reactor bank 10, followed by the direction of one of the two resulting streams to a heating zone in which this stream is heated prior to expansion through the turbine, and the passage of the other of the two compressed hydrogen streams through a heat exchange zone in which the compressed hydrogen yields up a portion of its heat for heating a cooler external fluid. The treatment of the two streams in this fashion is represented by the lines BC and BE, respectively, on the temperature-entropy diagram of FIG. 6. The process carried out in this fashion allows the construction of separate power production and refrigeration systems, utilizing compressed hydrogen from a single reactor bank source, and also allows energy to be conserved in obtaining both heating and refrigeration and enhanced power production in this fashion.

Figure 7:
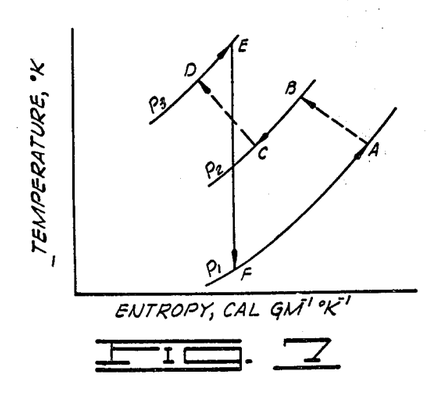
FIG. 7 is a temperature-entropy diagram illustrating the manner in which a plurality of hydride reactors containing different hydride materials characterized by differing equilibrium temperatures and pressures can be used in a complementary fashion to improve the efficiency and work developed upon expansion of the compressed hydrogen gas.

It is frequently desirable and advantageous to use a plurality of differing hydride materials and separate reactors within the same system in order to develop compressed hydrogen of a higher energy content prior to expansion through a turbine so as to obtain greater production of power, and also enhanced refrigeration from the cold exhaust from the turbine. In such cases, one of the hydride materials will have a lower equilibrium temperature and pressure than the other, and thus will accept hydrogen at a lower temperature and will reach equilibrium at a lower pressure prior to the activation stage. Following activation of this hydride, the hydrogen, in a compressed state and at the higher dehydriding temperature, can be released, and after temperature adjustment, such as by cooling, it can be passed to a second bed of hydridable material which, as a result of a higher equilibrium temperature and pressure of the hydride material formed, can accept the compressed hydrogen gas at higher temperature and pressure in order to form the hydride at the different equilibrium state. After hydriding the second hydridable material to its equilibrium state, the hydride is then heated to activate it, and after completion of the activation stage, the highly compressed hydrogen gas can be released by dehydriding in the manner previously described, and expanded through a turbine to provide the enhanced production of power. Of course, the compressed hydrogen gas can also be either heated or cooled after leaving the second hydride bed, and prior to expansion through the turbine.

A system in which two hydridable materials having differing equilibrium states are employed in series flow in the manner described is characterized by a power cycle having the temperature-entropy characteristics illustrated in FIG. 7. The hydride material having the lower equilibrium temperature and pressure accepts hydrogen and becomes fully hydrided at state A (pressure, $P_1$). It is then activated to pressure $P_2$ by further heating, and following activation, the hydrogen is released by dehydriding at state B. If the released hydrogen is cooled, for example, to state C, it may then be fed to a second hydridable material which is selected to have a substantially higher equilibrium pressure ($P_2$) than the first hydridable material. Alternatively, a hydridable material may be used in the second reactor which has both a higher equilibrium temperature and pressure than the hydridable material first subjected to hydriding, in which case it may not be necessary to pre-cool the compressed hydrogen gas released from the first reactor prior to its introduction to the second reactor.

In any event, assuming that the equilibrium pressure and temperature of the second hydridable material are represented by the point C on the FIG. 7 diagram, after this material is hydrided to equilibrium, it can be activated by further heating to bring the temperature and entropy of the chemically compressed hydrogen gas to state D. At this point, dehydriding of the second bed is commenced, and the compressed hydrogen gas is released at pressure $P_3$ from the bed, and may be either cooled, or as illustrated in FIG. 7, heated to state E prior to passing the compressed hot hydrogen gas through a turbine or other expansion device. Expansion through the turbine causes substantial cooling of the hydrogen gas, and a relatively greater production of power as represented by the expansion line E-F in FIG. 7.

Figure 8:
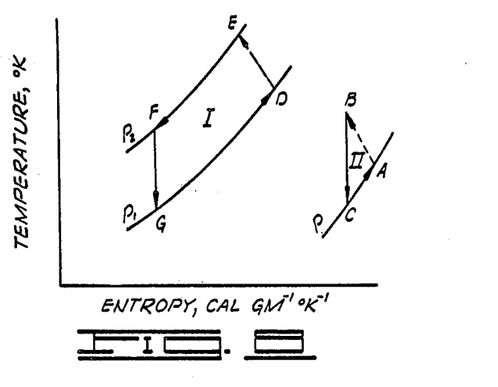
FIG. 8 is a temperature-entropy diagram illustrating the combination of a plurality of HDH power systems through a common heat exchange means.

It is advantageous, at times, to utilize some of the thermal energy developed in the hydriding phase in the course of an HDH cycle carried out in one system for heating hydrogen gas or a reactor bed in a second independent system. Thus, following the activation phase, and upon dehydriding of one reactor bed in one system, the hot compressed hydrogen gas may be passed in heat exchange relation to hydrogen gas being circulated in a second system utilizing the HDH cycle in order to enhance the overall thermal efficiency with which the two systems are operated. This relationship is shown in the FIG. 8 diagram in which a hydridable material in a first system, I, is activated from state D to state E, and is then dehydrided to release the hot compressed hydrogen gas. The gas as thus produced is then passed in heat exchange relation to a reactor bed in a second system II in order to provide all or a portion of the heat required to activate the hydride in such bed from state A to state B. The compressed hydrogen gas in the first system thereby undergoes cooling from state E to state F, after which it is expanded through a turbine to produce work, and its pressure drops from $P_2$ to $P_1$ in the first system. The primary advantage which is realized from the concurrent operation of two systems inter-related in the manner described is the production of a greater power output through the conservation of input energy. The same or different hydride materials can, of course, be used in the two systems.

It is also advantageous, at times, to utilize a second HDH cycle to cool the hydrogen being circulated through the precooler 170 of FIG. 2 of a first HDH cycle, said second cycle being used to provide the extra cooling needed to condense hydrogen within the first cycle or to provide refrigeration for a first cycle operating at a lower temperature.

Instead of passing the heated hydrogen gas generated in the reactor of the first system at state E in direct heat exchange relation to either the reactor in the second system, or in heat exchange relation to the hydrogen gas of the second system, an intermediate heat exchange medium can be passed in a closed loop in heat exchange relation to the hot hydrogen gas produced upon dehydriding the reactor in system I, and in heat exchange relation to the hydrogen gas used in the second system, or with respect to a reactor employed therein. This can entail the use of a heat exchanger pre-cooler of the sort illustrated in FIG. 2 for abstracting a portion of the heat of the hot compressed hydrogen gas yielded from a reactor bed of system I at state E, and carrying the received thermal energy, by such external, closed heat exchange loop to the point of yielding up the heat to a reactor bed of system II.

Figure 9:
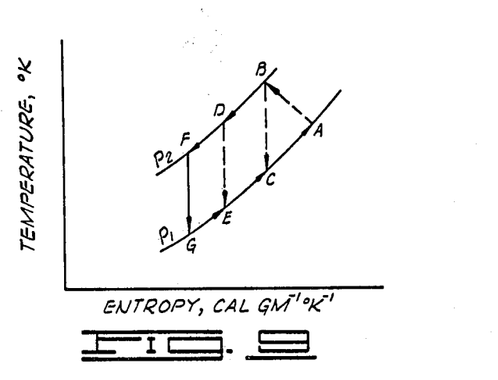
FIG. 9 is a temperature-entropy diagram illustrating the manner in which cascading of heat exchange can be used to improve the refrigeration attainable using the HDH power cycle.

The HDH power cycle can be beneficially utilized in a system which employs cascaded heat exchange. By employing such cascading, improved refrigeration utilizing the compressed hydrogen gas can be realized. Cascading of the type described is practiced by directing the cold exhaust from the turbine or other expansion means through one side of a heat exchanger where the cold exhaust in the turbine is utilized to pre-cool the inlet hydrogen being directed into the turbine. The effect of such cascading in improving the obtainable refrigeration will be better understood by referring to the portrayal in FIG. 9 of the temperature-entropy characteristics of the hydrogen gas utilized in such a system. Dehydriding of the reactor is commenced at state B. The hydrogen gas is then expanded through the turbine to state C. The hydrogen is then recycled and hydriding is carried out from state C to state A, followed by activation to state B. The cold hydrogen exhausted from the turbine during the initial expansion, B-C, is passed in heat exchange relation to the hydrogen subsequently produced upon dehydriding at state B so as to pre-cool the off-coming hydrogen to state D prior to expansion through the turbine to state E. The colder hydrogen thus produced after expansion through the turbine is again used for pre-cooling hydrogen subsequently expanded through the turbine to lower its temperature to state F. It will thus be seen that the cycle of cascading and reduction of the input temperature of the hydrogen charged to the turbine can be repeated so as to ultimately cascade the temperature to some relatively low equilibrium temperature. At such low equilibrium temperature, very cold hydrogen gas is yielded upon expansion through the turbine, with the result that improved refrigeration can be obtained with this turbine-exhausted hydrogen.

Figure 10:
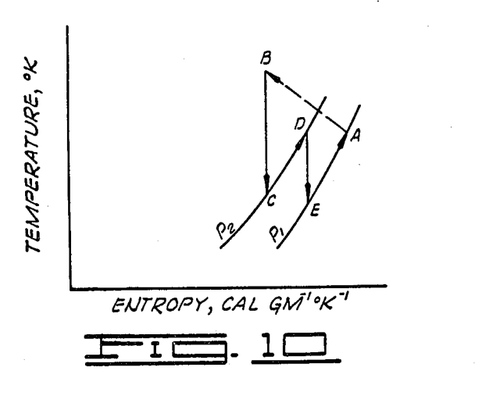
FIG. 10 is a temperature-entropy diagram illustrating the manner in which the hydrogen exhausting from a first expansion device in an HDH power cycle can be regeneratively heated so that further power may be extracted from a second expansion device.

The HDH cycle can be carried out in a way which, as contrasted with the enhanced or increased power production obtained when the hydrogen gas is heated upon release from the hydride bed in the manner shown in FIG. 5, does not require a heat exchange medium having as high a temperature as that which must be used to heat the released hydrogen from state B to state C in FIG. 5. This is accomplished by regenerative heating in which hydrogen gas released upon dehydriding of the hydride bed (state B as shown in either FIG. 5 or 10) is then expanded through a turbine or other work producing expansion device to state C as shown in FIG. 10. The exhausted hydrogen is then regeneratively heated to increase its temperature from state C to state D (FIG. 10). It will be apparent that this entails the use of a heat exchange medium which can be at a lower temperature for effecting such regenerative heating of the exhausted hydrogen gas than is required to directly and immediately heat the hydrogen produced in the reactor from state B to state C as shown in FIG. 5.

After the hydrogen gas from the turbine exhaust has been heated to state D as shown in FIG. 10, it can be expanded through a second turbine so that the temperature and pressure are lowered, as shown by the line D-E. The cycle of hydriding, activation, dehydriding and expansion are then repeated, with regenerative heating of the turbine exhaust again carried out as shown in FIG. 10. When the HDH cycle is practiced in this fashion, it will be seen that greater total power and refrigeration is developed from the hydrogen gas as a result of the dual expansion through the two expansion devices. Moreover, when it is recalled that the hydriding reaction is an exothermic one, it will be perceived that a portion of the heat developed in the reactor bed as the hydridable material is hydrided from state E to state A can be used to provide a part of the heat for the regenerative heating of hydrogen gas from state C to state D. Thus, energy conservation is effected by making use of a portion of the heat developed upon effecting the hydriding phase in the reactor.

The possibility of utilizing the heat of reaction developed during the hydriding phase occurring in one of the hydride reactors for regeneratively heating hydrogen gas which has been expanded through a first expansion device, as discussed in reference to FIG. 10, suggests another important usage of the HDH cycle. Thus, where two separate systems are provided, similar to the two systems earlier discussed in referring to FIG. 8, the thermal energy developed upon hydriding the reactor bed in one of the systems can be utilized for providing the activation heat required for activating a hydride in a second system preparatory to commencing the dehydriding phase. Of course, for the thermal energy developed upon hydriding of a reactor bed in the first system to be adequate to supply the entire energy requirement for effecting complete activation of a hydride bed in the second HDH power system, the equilibrium characteristics of the two hydrides involved will, of necessity, be different so as to facilitate such heat utilization. It will further be apparent that the reactors as between which the described heat exchange is carried out may also be located within the same system, with differing hydride materials utilized in the reactors to facilitate maximum utilization of the available heat of reaction.

It will also be noted from the foregoing discussion that heat is available in the spent reactor bed upon completion of the dehydriding phase of the HDH cycle, and such heat must be removed in restoring the bed to a cooler state preparatory to receiving hydrogen gas to recommence the hydriding phase of the cycle. Again, this heat may, at this time, be beneficially abstracted from the reactor bed and used for providing the activation heat needed for a different hydride bed, either in the same or a different system. It can also be used for providing the heat necessary for dehydriding an activated hydride in a different reactor within the same or different system.

As previously pointed out herein, the HDH cycle can be utilized to provide a very cold heat sink in an ancillary power cycle. When work is taken out of the high pressure hydrogen gas derived from the hydride reactor upon dehydriding, the gas is cooled to a very low temperature. All thermodynamic cycles require a heat sink, and the very low temperature of the expanded hydrogen gas developed in the HDH cycle provides an extremely low temperature heat sink for inclusion in a different thermodynamic cycle using a different working fluid.

Figure 11:
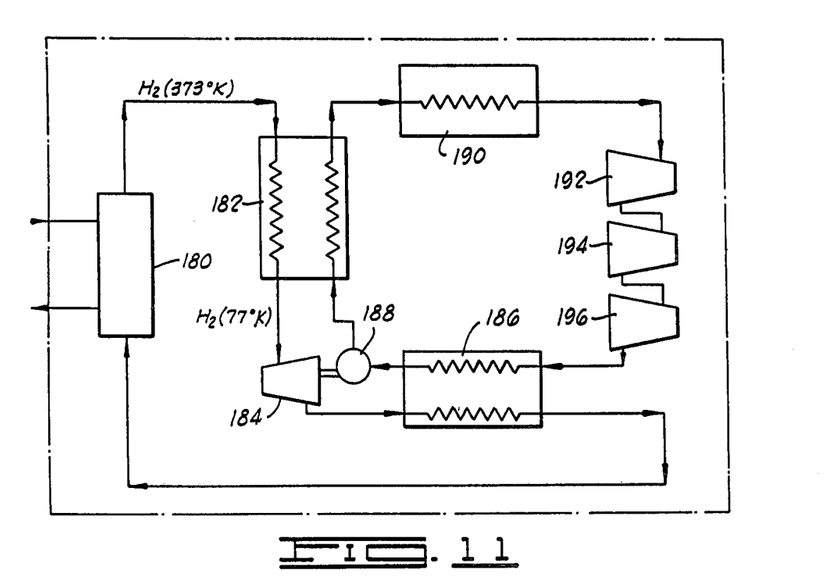
FIG. 11 is a schematic flow diagram illustrating the manner in which the pressurized hydrogen from a hydride reactor bank can be utilized to provide a very low temperature heat sink for a primary Rankine power cycle utilizing nitrogen.
Figures 12, 13, 14:
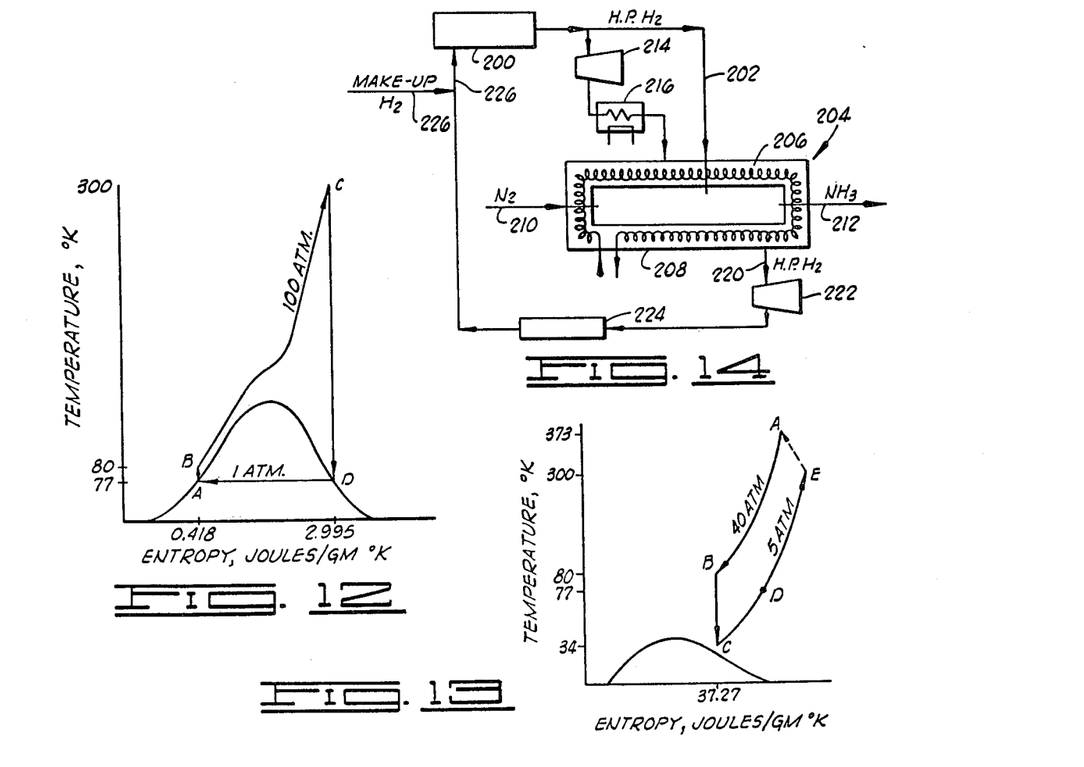
FIG. 12 is the temperature-entropy diagram for nitrogen as the nitrogen is utilized in an ideal Rankine cycle corresponding to the power cycle shown in FIG. 11.
FIG. 13 is the temperature-entropy diagram for hydrogen as used in the auxiliary HDH power cycle employed in the system shown in FIG. 11.
FIG. 14 is a schematic flow diagram illustrating the use of the HDH power cycle in the production of ammonia.

A system employing the low temperature heat sink achieved through the use of the HDH cycle is illustrated in FIG. 11, and can best be understood by referring to that figure in conjunction with FIG. 12. FIG. 12 portrays the ideal behavior of nitrogen in a Rankine cycle. Beginning at stage A on the temperature-entropy diagram, the nitrogen is a saturated liquid at 77° K. and at one atmosphere pressure. The nitrogen is then compressed isentropically and adiabatically to state B at which it is at 100 atmospheres pressure and about 80° K. After compression by pumping, the nitrogen is heated at this constant pressure of 100 atmospheres to state C which is at 300° K. This value is selected to show that useful power can be obtained from the compressed nitrogen by merely employing ambient temperature water to effect the heating required. The nitrogen is subsequently expanded isentropically and adiabatically to state D which is saturated vapor at 1 atmosphere pressure and 77° K. The nitrogen is then condensed to state A. The condensation of the nitrogen can be beneficially effected by the use of the low temperature heat sink provided by the HDH cycle.

A system which employs this principle is illustrated in FIG. 11 and the temperature-entropy diagram of the parallel HDH cycle providing the low temperature heat sink is depicted in FIG. 13. A reactor bank of the type hereinbefore described is illustrated at 180 in FIG. 11, and highly compressed hydrogen gas is produced and discharged from the reactor bank during the dehydriding cycle. At this time, heat is being supplied to the reactor bank to dehydride the particular hydride alloy which is in a state of activation, and ready for dehydriding. For purposes of discussion, it may be postulated, for example, that a heat of one megawatt at 212° F. (or 373° K.) is supplied to a hydrided iron titanium powder in one of the reactors in the reactor bank. The hydrogen equilibrium pressure at this temperature is 40 atmospheres, and this point is indicated by state A on the temperature-entropy diagram of FIG. 13. One megawatt of thermal energy supplied to the dehydriding reactor bed will release 256 kg/hr of hydrogen.

The released compressed hydrogen is passed from the reactor bank to a heat exchange device 182. Here the compressed hydrogen is cooled by heat exchange with liquid nitrogen entering the heat exchange device at a temperature of about 80° K. In the course of this heat exchange, the hydrogen is cooled to about 80° K. (state B in FIG. 13) and the nitrogen is heated to about 300° K. (state C in FIG. 12). The hydrogen is then expanded through a turbine or other suitable device 184 to further reduce its temperature to 34° K., and its pressure to 5 atmospheres (state C in FIG. 13). The 5 atmospheres pressure is the equilibrium pressure of the hydrogen with the iron titanium powder at 300° K. The cold hydrogen leaving the turbine 184 is then passed through a heat exchanger 186 where heat is exchanged with saturated nitrogen gas which is at about 1 atmosphere pressure and 77° K. (state D on FIG. 12). At the 256 kg/hr of hydrogen mass flow rate developed upon application of one megawatt of thermal energy to the hydrided iron titanium powder reactor, 627 kg/hr of nitrogen is condensed by passage through the heat exchange device 186. The heat exchange at this location thus has the effect of changing the temperature-entropy characteristic of hydrogen to state D as shown in FIG. 13, and the temperature-entropy characteristic of the nitrogen to state A in the diagram of FIG. 12.

The hydrogen from the heat exchanger 186 is then recycled to the reactor bed 180 where completion of the hydriding of the iron titanium powder in the charging reactors of the bank is completed, and state E of the FIG. 13 diagram is achieved. Activation of the hydride bed to state A to recommence the cycle is then achieved by the application of heat from an external, relatively low temperature thermal energy source.

The saturated liquid nitrogen leaving the heat exchange device 186 is compressed to 100 atmospheres by the use of a pump 188 which is driven by the turbine 184. The nitrogen is then heated by passage through the heat exchanger 182 to 300° K., and can be heated to some higher temperature not shown on FIG. 12 by heat from some external source, such as a nuclear reactor or fossil fuel heater 190. The compressed nitrogen is passed from the heater 190 to a serially staged group of three expander devices 192, 194 and 196 which extract work from the compressed nitrogen in a series of pressure drop stages across the three devices. In this manner, the nitrogen gas is decompressed and returned to state D shown in the temperature-entropy diagram of FIG. 12.

The foregoing discussion assumes ideality in a Rankine cycle using nitrogen as the working fluid, and using, in conjunction therewith, an HDH cycle, ideally operated, for the purpose of providing a low temperature heat sink. The nitrogen in the postulated ideal Rankine cycle produces 37.4 kW of power at 0.53 thermal efficiency. The Carnot efficiency at the temperature employed in the described ideal Rankine cycle is 0.74. The HDH cycle employed produced, ideally, 29 kW of power at a thermal efficiency of 0.03, and the equivalent Carnot efficiency would be 0.21. The Rankine cycle can also be further improved by the use of appropriate computer design optimization techniques to yield better operating pressures and temperatures so as to effect a greater production of power and refrigeration.

In FIG. 14 of the drawings, another important application of the HDH cycle is illustrated. High pressure hydrogen of elevated temperature is produced in a hydride reactor bank 200. The stream of pressurized product hydrogen is split, with a portion being delivered via a conduit 202 to the interior of an ammonia generator reactor designated generally by reference numeral 204. The ammonia generator reactor 204 is provided with a peripheral chamber around the central reaction zone in the ammonia reactor, and this peripheral chamber confines a hydridable material forming a hydride reactor 206. The hydride reactor 206 around the periphery of the central reaction zone provided in the ammonia reactor 204 will preferably also contain a suitable heat exchange loop 208 to facilitate control of the exothermic hydride reaction occurring therein as hereinafter explained. A suitable conduit 210 is provided which extends through the chamber 206 to the central reaction zone of the ammonia reactor 204 for delivering nitrogen gas to the reactor. Within the reactor 204, the hydrogen and nitrogen react in an exothermic reaction to yield ammonia which is discharged from the ammonia reactor 204 via a conduit 212.

A part of the compressed hydrogen gas from the hydride reactor bank 200 is expanded through an expansion device 214 and is thereby cooled to a low temperature. The low temperature decompressed hydrogen from the expansion device 214 is preferably passed through a refrigeration heat exchanger 216 where the hydrogen cools an external fluid and itself is warmed preparatory to charging it to the hydride reactor 206 in the external chamber formed around the ammonia reactor 204. In the hydride reactor 206, hydrogen reacts with a hydridable material in the manner hereinbefore described, with the heat of hydriding (exothermic heat of reaction) being appropriately controlled by use of an external heat exchange medium circulated in the reactor 206 in the heat exchange loop 208.

For the purpose of providing the heat necessary to activate the hydride formed in the hydride reactor 206, the exothermic heat of reaction of the hydrogen and nitrogen in forming ammonia within the ammonia reactor 204 is transferred to the hydrided material in the hydride reactor 206, and the same heat source can be used to effect dehydriding when the pressurized hydrogen gas produced in the hydride reactor 206 is to be released. The pressurized hydrogen gas from the reactor 206 is discharged via a suitable conduit 220, is expanded through a turbine 222 or other suitable expansion device and the cold hydrogen is then passed through a refrigeration heat exchanger 224 before recycling to the hydride reactor bank 200. Since a portion of the compressed hydrogen produced in the reactor bank 200 has been used to produce ammonia, it is necessary to add some make-up hydrogen to that which is derived from the hydride reactor 206, and this is accomplished through a make-up hydrogen conduit 226. A portion of the power produced by the turbines 214 and 222 may be used, for example, for pumping the ammonia to a storage facility and, if necessary, for providing the power necessary to deliver the nitrogen gas to the ammonia reactor 204.

From the foregoing description of the invention, it will be apparent that the present invention provides a number of energy conserving power cycles which are capable of producing enhanced quantities of work and which utilize, in either a primary or auxiliary power cycle, the HDH power cycle hereinbefore described, and described in greater detail in our copending application serial number 553,248. Although various changes and modifications can be effected in the preferred embodiments of the invention which have been herein described, it will be understood that such changes can be effected without departure from the basic principles which underlie the invention in its most fundamental form. Changes and innovations of this type are therefore deemed to be circumscribed by the spirit and scope of the invention, except as the same may be necessarily limited by the appended claims or reasonable equivalents thereof.

What is claimed is:

1. Apparatus for carrying out exothermal chemical reactions of hydrogen comprising:

a hydrogen reactor defining a first reaction zone for receiving hydrogen gas and a second reactant reactive with the hydrogen gas in said reaction zone in an exothermal reaction;

a first hydride reactor containing a hydridable material in a second reaction zone positioned adjacent said first reaction zone, and in heat exchange relation thereto, for heating said hydridable material with the heat of reaction evolved in said exothermal reaction occurring in said first reaction zone;

conduit means for conveying said second reactant to said first reaction zone;

a second hydride reactor containing a hydridable material for producing compressed hydrogen gas; and means for conveying compressed hydrogen gas from said second hydride reactor to one of said first and second reaction zones.

2. Apparatus as defined in claim 1 wherein said means for conveying hydrogen gas from said second hydride reactor to one of said first and second reaction zones comprises a conduit extending from said second hydride reactor to said first reaction zone.

3. Apparatus as defined in claim 1 wherein said means for conveying hydrogen gas from said second hydride reactor to one of said first and second reaction zones comprises:

a power producing expansion device;

a refrigeration heat exchanger device; and conduit means interconnecting said second hydride reactor, said power producing expansion device, said refrigeration heat exchanger device and said second reaction zone to convey hydrogen gas from said second hydride reactor to said power producing expansion device and from said power producing expansion device to said refrigeration heat exchange device and from said heat exchange device to said second reaction zone.

* * * * *